(12) United States Patent
Venkataraman et al.

(10) Patent No.: US 11,477,528 B2
(45) Date of Patent: *Oct. 18, 2022

(54) SYSTEMS AND METHODS FOR PREVENTING CORRUPTION OF USER VIEWING PROFILES

(71) Applicant: Rovi Guides, Inc., San Jose, CA (US)

(72) Inventors: Sashikumar Venkataraman, Andover, MA (US); Abhijit Satchidanand Savarkar, Andover, MA (US); Linda Beach, Redwood City, CA (US)

(73) Assignee: ROVI GUIDES, INC., San Jose, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 17/112,253

(22) Filed: Dec. 4, 2020

(65) Prior Publication Data

US 2021/0168451 A1 Jun. 3, 2021

Related U.S. Application Data

(63) Continuation of application No. 15/857,401, filed on Dec. 28, 2017, now Pat. No. 10,893,328, which is a continuation of application No. 15/221,780, filed on Jul. 28, 2016, now Pat. No. 9,860,596.

(51) Int. Cl.
*H04N 21/45* (2011.01)
*H04N 21/488* (2011.01)
*H04N 21/466* (2011.01)
*H04N 21/442* (2011.01)

(52) U.S. Cl.
CPC .... *H04N 21/4532* (2013.01); *H04N 21/44226* (2020.08); *H04N 21/4667* (2013.01); *H04N 21/4882* (2013.01)

(58) Field of Classification Search
CPC ......... H04N 21/4532; H04N 21/44226; H04N 21/4667; H04N 21/4882
See application file for complete search history.

(56) References Cited

U.S. PATENT DOCUMENTS

| | | | |
|---|---|---|---|
| 7,657,907 B2 * | 2/2010 | Fennan | H04N 21/454 725/45 |
| 7,730,546 B2 * | 6/2010 | Aoki | G06F 21/31 726/28 |
| 8,176,510 B2 | 5/2012 | Craner | |
| 8,387,093 B2 | 2/2013 | Danker et al. | |
| 8,689,250 B2 | 4/2014 | Bhide et al. | |

(Continued)

*Primary Examiner* — Oschta I Montoya
(74) *Attorney, Agent, or Firm* — Haley Guiliano LLP

(57) ABSTRACT

Systems and methods are described to address shortcomings in conventional media systems via a novel technique to prevent corruption of a user's viewing profile. In some aspects, a user of an interactive media guidance application may select a media asset for viewing on a user device. The interactive media guidance application may receive a user viewing profile for the user from a remote server. If the media asset is determined to not be consistent with the user viewing profile, the interactive media guidance application may retrieve another user viewing profile for another user of the user device. If the media asset is determined to be consistent with the other user viewing profile, the interactive media guidance application may update the other user viewing profile based on the media asset.

20 Claims, 9 Drawing Sheets

(56) References Cited

U.S. PATENT DOCUMENTS

| | | | |
|---|---|---|---|
| 8,949,873 B1 | 2/2015 | Bayer et al. | |
| 2002/0104087 A1* | 8/2002 | Schaffer | H04N 21/44222 |
| | | | 725/9 |
| 2003/0115592 A1 | 6/2003 | Johnson | |
| 2004/0073924 A1 | 4/2004 | Pendakur | |
| 2004/0255321 A1 | 12/2004 | Matz | |
| 2007/0157220 A1* | 7/2007 | Cordray | H04N 21/43615 |
| | | | 386/E5.07 |
| 2009/0055856 A1 | 2/2009 | Christian | |
| 2010/0122293 A1 | 5/2010 | Craner | |
| 2015/0128164 A1 | 5/2015 | Fundament et al. | |
| 2015/0181289 A1* | 6/2015 | Wheatley | H04N 21/4532 |
| | | | 725/14 |

* cited by examiner

SYSTEMS AND METHODS FOR PREVENTING CORRUPTION OF USER VIEWING PROFILES

CROSS-REFERENCE TO RELATED APPLICATION

This application is a Continuation Application of U.S. patent application Ser. No. 15/857,401, filed Dec. 28, 2017, which is a Continuation Application of U.S. patent application Ser. No. 15/221,780, filed Jul. 28, 2016, now U.S. Pat. No. 9,860,596, which are hereby incorporated by reference herein in their entireties.

BACKGROUND

Conventional media systems can keep track of the television programs that have been viewed on a particular user device. Some conventional systems can keep track of television programs that have been viewed on all user devices in a particular household. Yet other conventional systems can keep track of television programs that have been viewed by individual household members on these user devices and generate user viewing histories for each household member. Typically, these conventional systems require the household member to create a user profile and associate the television programs viewed by the household member to his or her user profile. However, there is no provision in conventional systems to detect whether the correct user profile has been selected for the household member currently viewing television programs on a user device. If an incorrect user profile is selected, the user profile may be corrupted due to inclusion of the television programs that the household member has viewed while the incorrect user profile was selected.

SUMMARY

Systems and methods are described to address shortcomings in conventional media systems via a novel technique to prevent corruption of a user's viewing profile. In some aspects, the systems and methods determine that a media asset, such as a television program, selected for viewing is inconsistent with the currently selected user viewing profile and determine another user viewing profile such that the media asset is consistent with the other user viewing profile. The systems and methods may be implemented via an interactive media guidance application running on a user device, a remote server, or another suitable device. The interactive media guidance application may be implemented partially on multiple devices such that some portions of the interactive media guidance application are executed on one device while other portions of the interactive media guidance application are executed on another device.

Certain viewing situations may not necessarily be a part of a user's ordinary viewing experience. These viewing situations may "corrupt" the user's viewing profile and therefore provide unwanted recommendations of particular media content to the user. For example, a father may view action films, sports programs, and news programs on a regular basis, but a child may occasionally view a cartoon program on his father's account, thereby "corrupting" his profile. In another example, the user may view one episode to see what all the hype is about for popular programming, such as the television program "Downton Abbey." However, the television program may not necessarily be of interest to the user. When a particular television program is viewed on a user's account that is not consistent with their regular viewing habits, the interactive media guidance application may prompt the user to provide feedback on the particular television program (e.g., whether or not the user liked it) or whether the user would like to include the television program in the user's viewing profile. Accordingly, the user's viewing profile may be prevented from being corrupted if the media content is orthogonal to the user's typical viewing habits.

For example, a viewer may select a television program for viewing. The interactive media guidance application may retrieve the user's viewing profile or a set of rules associated with the user's viewing profile to analyze whether the television program is inconsistent with the user's viewing patterns. Additionally or alternatively, the interactive media guidance application may compare the television program to user viewing profiles from other users who have profiles similar to the current user. The interactive media guidance application may determine that the selected television program is inconsistent with the user's viewing profile and, in response, perform a related function. The interactive media guidance application may notify the user of the inconsistency. Additionally, the interactive media guidance application may prompt the user to confirm whether he or she would like to proceed with the selected television program. Additionally or alternatively, the interactive media guidance application may offer the user an option to proceed with the selected television program without updating the user's viewing profile to indicate that the user has viewed the television program.

Additionally or alternatively, the interactive media guidance application may notify the user of the inconsistency and update another user's viewing profile that is consistent with the selected television program. The interactive media guidance application may update the other user's viewing profile automatically or prompt the user to affirmatively select the other user's viewing profile. For example, if a child selects a television program while the parent's user viewing profile is in use, the interactive media guidance application may recognize that the selected program is inconsistent with the parent's user viewing profile but consistent with the child's user viewing profile. The interactive media guidance application may update the child's user viewing profile, indicating the child has viewed the selected television program, instead of updating the parent's user viewing profile with the selected television program.

In another example, the interactive media guidance application may determine that a selected television program is inconsistent with a currently selected child's user viewing profile and notify the parent regarding the inconsistency. For example, the child may have selected a television program that is inappropriate for him or her. The interactive media guidance application may notify the parent so he or she may review the television program for appropriateness. Alternatively, the parent may learn that another family member had selected the television program but it was inconsistent with the child's user viewing profile which was last used on the user device in question.

The user viewing profile may include information regarding the television programs the user has viewed in the past. The user viewing profile may include information such as genre, rating, actor, director, channel, air time, end time, air length, length watched, date, month, day of the week, and other suitable information relating to the television program. The interactive media guidance application or another suitable application may analyze information regarding television programs viewed by the user and determine trends across the information. For example, the interactive media guidance application may determine that a majority of the viewed television programs belong to the comedy genre. In such a case, if the user were to select a television program belonging to the horror genre, the interactive media guidance application may determine the selected television program to be inconsistent with the user's viewing profile.

In another example, the interactive media guidance application may determine that the user predominantly watches television programs from the comedy genre on weekdays but watches television programs form the drama genre on weekends. In such a case, if the user were to select a television program belonging to the drama genre on a weekday, the interactive media guidance application may determine the selected television program to be inconsistent with the user's viewing profile. In another example, the interactive media guidance may determine that the user watches television programs relating to soccer games in the summer months but watches television programs relating to football games in the winter months. In such a case, if the user were to select a television program relating to soccer in a winter month, the interactive media guidance application may determine the selected television program to be inconsistent with the user's viewing profile.

The interactive media guidance application may analyze past determinations of inconsistent television programs being selected to determine similar future occurrences. For example, the interactive media guidance application may analyze multiple determinations of inconsistent television programs being selected during the Thanksgiving holiday. The user may have visitors at his or her home who may select television programs that are inconsistent with the user's viewing profile. The interactive media guidance application may determine that this period is appropriate for preventing updates to the user's viewing profile based on the selected television programs. In another example, the interactive media guidance application may analyze multiple determinations of inconsistent television programs being selected during the first week of new fall television programming. The user may be trying out new fall television programming to find a new favorite show, but some or all of the selected television programs may be inconsistent with the user's viewing profile. The interactive media guidance application may determine that this period is appropriate for preventing updates to the user's viewing profile based on the selected television programs.

The interactive media guidance application or another suitable application may determine rules based on the information in the user's viewing profile. The interactive media guidance application may store the rules in local memory for easy access while the user's viewing profile may be stored at a remote server. The rules may require less storage space and may be more resource efficient when determining whether a selected television program is consistent with the user's viewing profile. The rules may be updated when the information in the user's viewing profile is changed. In some embodiments, the rules are updated at every instance information is changed in the user's viewing profile. In some embodiments, the rules are updated at specified intervals of time. In some embodiments, the rules are updated after a threshold number of changes have occurred to the user's viewing profile.

In some aspects, a user, such as a parent or a child, of the interactive media guidance application may select a media asset, such as television program "Care Bears," for viewing on a user device, such as a set-top box, a television device, a mobile device, or another suitable device. The interactive media guidance application may receive a user viewing profile for a first user, such as the parent, from a remote server. Alternatively, the interactive media guidance application may have already received the user viewing profile for the first user from the remote server. The interactive media guidance application may determine whether the media asset is consistent with the user viewing profile for the first user. If the media asset is determined to not be consistent with the user viewing profile, the interactive media guidance application may retrieve another user viewing profile for another user of the user device, such as the child. The interactive media guidance application may determine whether the media asset is consistent with the other user viewing profile. If the media asset is determined to be consistent with the other user viewing profile, the interactive media guidance application may update the other user viewing profile based on the media asset.

In some aspects, the systems and methods described herein provide for a method for preventing corruption of a first user viewing profile for a first user of a user device. The method may be implemented via an interactive media guidance application that is executed on control circuitry. The interactive media guidance application receives, from a remote server, the first user viewing profile including a first plurality of media assets. The interactive media guidance application determines a first set of rules for the first user viewing profile based on the first plurality of media assets. The interactive media guidance application receives a selection to view a media asset on the user device. The interactive media guidance application applies the first set of rules to the media asset to determine whether the media asset is consistent with the first user viewing profile.

In response to determining that the media asset is not consistent with the first user viewing profile, the interactive media guidance application retrieves, from the remote server, a second user viewing profile for a second user of the user device. The second user viewing profile includes a second plurality of media assets and is associated with a second set of rules. The interactive media guidance application further applies the second set of rules to the media asset to determine whether the media asset is consistent with the second user viewing profile. In response to determining that the media asset is consistent with the second user viewing profile, the interactive media guidance application updates the second user viewing profile to include the media asset in the second plurality of media assets. The interactive media guidance application further updates the second set of rules for the second user viewing profile based on the updated second plurality of media assets.

In some embodiments, in response to determining that the media asset is consistent with the first user viewing profile, the interactive media guidance application updates the first user viewing profile to include the media asset in the first plurality of media assets. The interactive media guidance application further updates the first set of rules for the first user viewing profile based on the updated first plurality of media assets.

In some embodiments, the first set of rules is stored in a local memory of the user device and the first viewing profile is stored on the remote server.

In some embodiments, the interactive media guidance application determines the first set of rules for the first user viewing profile based on the first plurality of media assets by retrieving one or more metadata tags for each of the first plurality of media assets, determining one or more trends in the one or more metadata tags for each of the first plurality of media assets, and determining the first set of rules based on the one or more trends.

In some embodiments, the one more metadata tags includes one or more of a genre, a time slot, a title, a channel, a media source, a language, a month, a day of week, a parental rating, and a popularity rating.

In some embodiments, the interactive media guidance application applies the first set of rules to the media asset to determine whether the media asset is consistent with the first user viewing profile by retrieving one or more metadata tags for the media asset, and determining, based on the one or more metadata tags, whether any of the first set of rules indicate a likelihood of the first user having selected the media asset.

In some embodiments, the interactive media guidance application generates for display a prompt requesting confirmation from the first user whether to proceed with the selected media asset in response to determining that the media asset is not consistent with the first user viewing profile.

In some embodiments, in response to receiving the confirmation from the first user to proceed with the selected media asset, the interactive media guidance application generates for display another prompt requesting a passcode from the first user.

In some embodiments, the interactive media guidance application receives the passcode. In response to the passcode being incorrect, the interactive media guidance application generates for display the media asset but prevents the media asset from being included in the first user viewing profile.

In some embodiments, in response to the passcode being correct, the interactive media guidance application generates for display the media asset and including the media asset in the first user viewing profile.

There is no provision in conventional systems to detect whether the correct user profile has been selected for the household member currently viewing television programs on a user device. If an incorrect user profile is selected, the user profile may be corrupted due to inclusion of the television programs that the household member has viewed while the incorrect user profile was selected. The described systems and methods address shortcomings in conventional systems via a novel technique to prevent corruption of a user's viewing profile. In some aspects, the systems and methods determine that a media asset, such as a television program, selected for viewing is inconsistent with the currently selected user viewing profile and determine another user viewing profile such that the media asset is consistent with the other user viewing profile. While conventional systems require the household member to manually specify a user profile and associate the television programs viewed by the household member to the specified user profile, the described systems and methods can prevent corruption of a user's viewing profile by televisions programs being viewed by another user and optionally determine the other user's viewing profile as the television programs are viewed.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described to address shortcomings in conventional media systems via a novel technique to prevent corruption of a user's viewing profile. The systems and methods may be implemented via an interactive media guidance application running on a user device, a remote server, or another suitable device. The interactive media guidance application may be implemented partially on multiple devices such that some portions of the interactive media guidance application are executed on one device while other portions of the interactive media guidance application are executed on another device.

Figure 1:
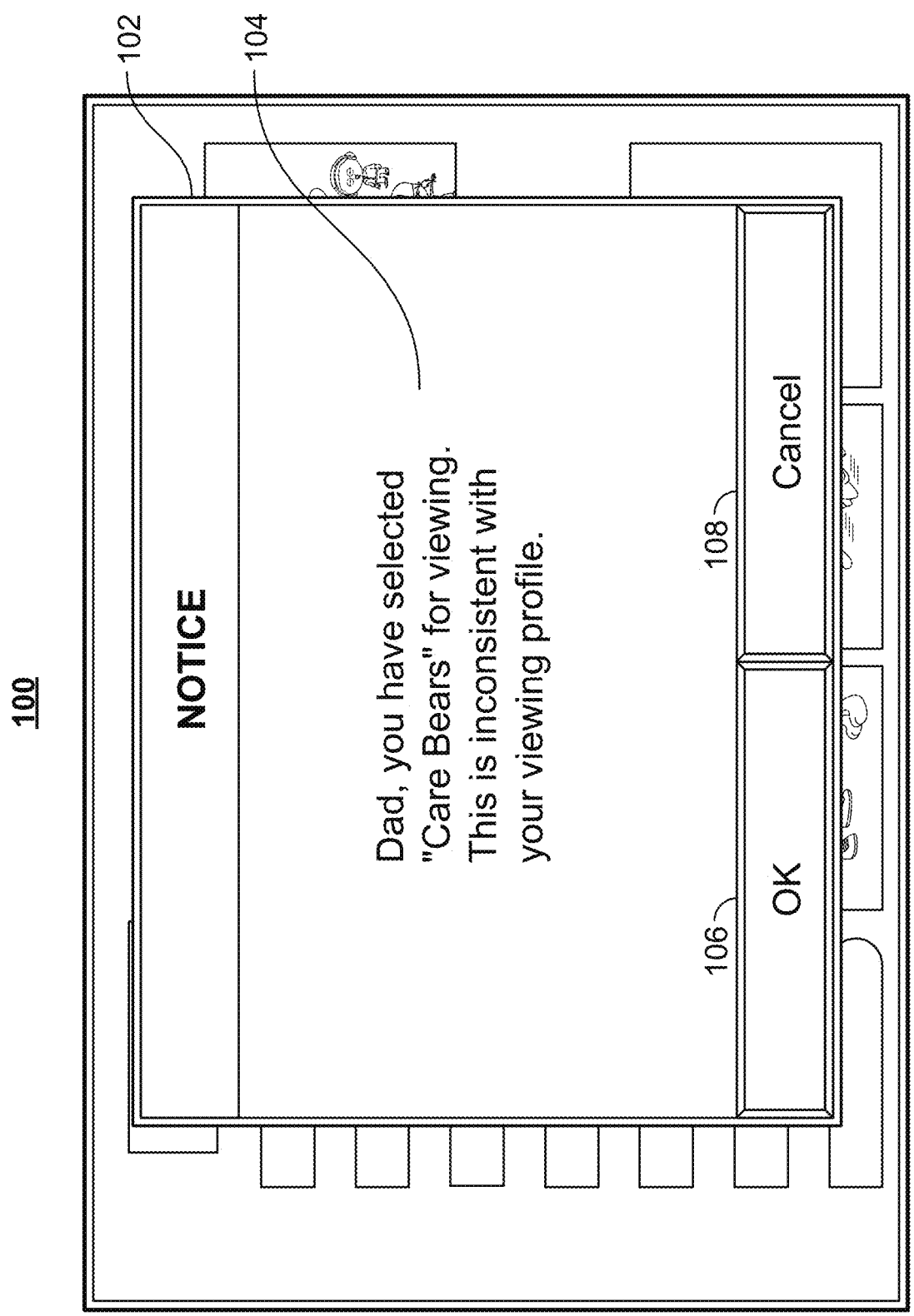
FIG. 1 shows an illustrative example of a display screen generated by a media guidance application in accordance with some embodiments of the disclosure.

FIG. 1 shows an illustrative example of a display screen 100 generated by the interactive media guidance application. In the example, the user has requested television program "Care Bears" for viewing. For example, the user may be a parent who is a fan and wishes to view the television program. In another example, the user may wish to preview the television program and judge its appropriateness for his or her child. In yet another example, the user may be a parent who has accidentally selected this television program. In yet another example, the user may be a child who has selected to view the television program while the parent's user viewing profile is selected.

Figure 7:
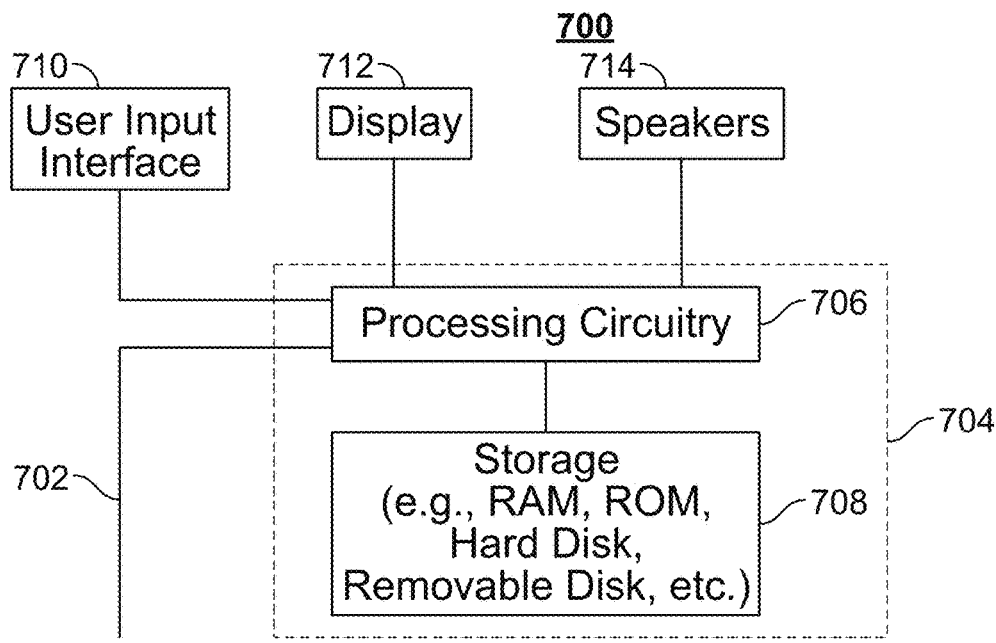
FIG. 7 is a block diagram of an illustrative user equipment device in accordance with some embodiments of the disclosure.

The interactive media guidance application may retrieve a user viewing profile for the parent, i.e., the currently selected user, from remote sources 816 or 818 (FIG. 8) and/or a set of rules for the parent's user viewing profile from local storage 708 (FIG. 7). When a particular television program is viewed on a user's account that is not consistent with their regular viewing habits, the interactive media guidance application may generate prompt 102 and notify the user via message 104 that the selected program is inconsistent with the user's viewing profile. The user may choose to proceed via option 106 or cancel viewing of the television program via option 108. Accordingly, the user's viewing profile may be prevented from being corrupted if the media content is orthogonal to the user's typical viewing habits.

In the example where the user is a parent who is a fan of the television program, the parent may select option 106 to proceed with viewing the program. In the example where the user wishes to preview the television program and judge its appropriateness for his or her child, the parent may select option 106 to proceed with viewing the program. In the example where the user is a parent who has accidentally selected this television program, the parent may select option 108 to cancel viewing of the television program. In the example where a child has selected to view the television program while the parent's user viewing profile is selected, the child may select option 108 to cancel viewing of the television program. The child may switch to his or her own user viewing profile and proceed to reselect the television program for viewing. The provided examples do not limit the scope of the described systems and methods and may be equally applicable to other suitable situations where the selected television program is inconsistent with the currently selected user viewing profile.

Figure 2:
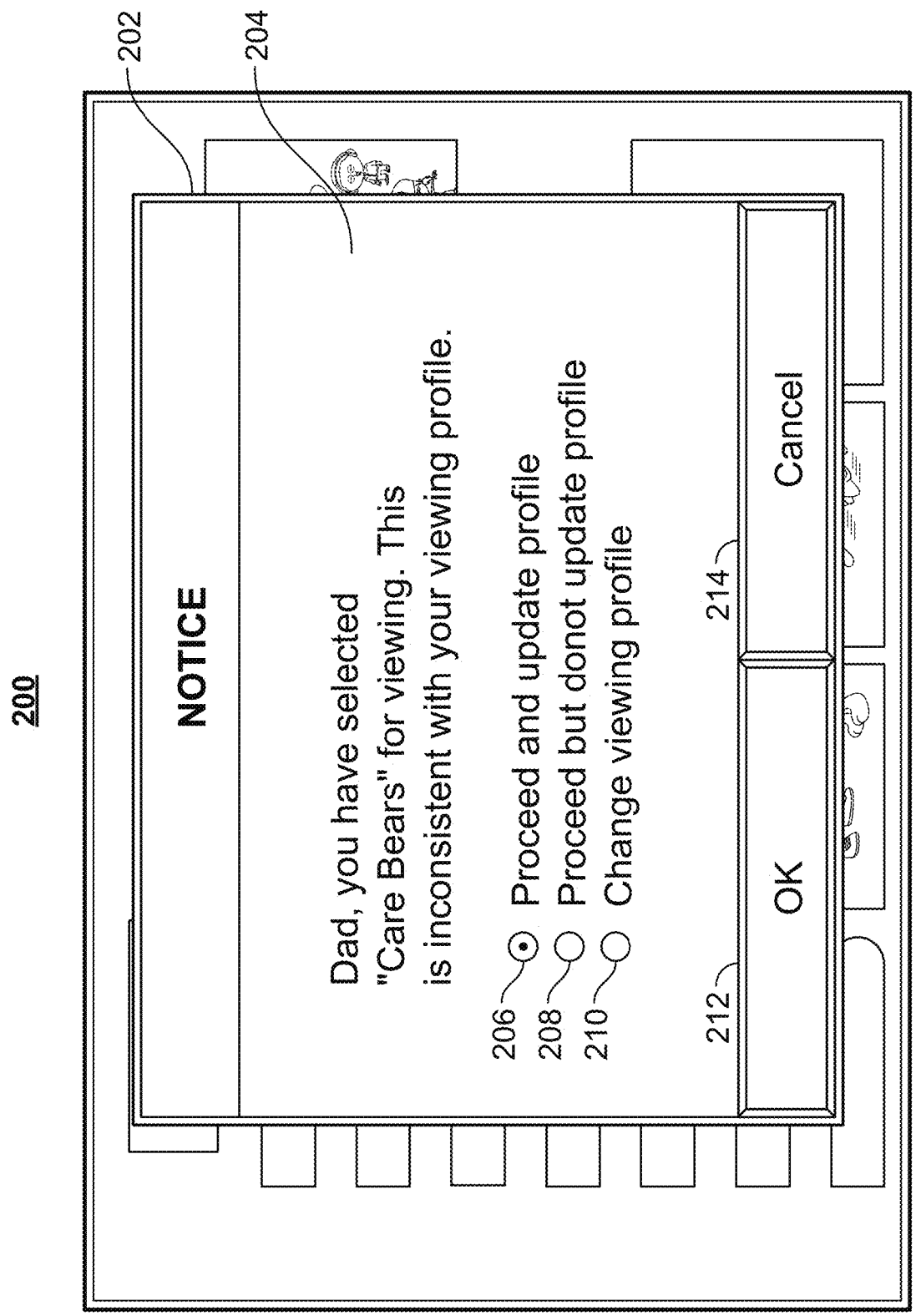
FIG. 2 shows another illustrative example of a display screen generated by a media guidance application in accordance with some embodiments of the disclosure.

FIG. 2 shows an illustrative example of a display screen 200 generated by the interactive media guidance application. In the example, the user has requested television program "Care Bears" for viewing. For example, the user may be a parent who is a fan and wishes to view the television program. In another example, the user may wish to preview the television program and judge its appropriateness for his or her child. In yet another example, the user may be a parent who has accidentally selected this television program. In yet another example, the user may be a child who has selected to view the television program while the parent's user viewing profile is selected.

The interactive media guidance application may retrieve a user viewing profile for the parent, i.e., the currently selected user, from remote sources 816 or 818 (FIG. 8) and/or a set of rules for the parent's user viewing profile from local storage 708 (FIG. 7). When a particular television program is viewed on a user's account that is not consistent with their regular viewing habits, the interactive media guidance application may generate prompt 202 and notify the user via message 204 that the selected program is inconsistent with the user's viewing profile. The user may choose to proceed and update the user's viewing profile via option 206, proceed but not update the user's viewing profile via option 208, or change the user's viewing profile via option 210. The user may proceed with the default option via option 212 or cancel viewing of the television program via option 214. Accordingly, the user's viewing profile may be prevented from being corrupted if the media content is orthogonal to the user's typical viewing habits.

In the example where the user is a parent who is a fan of the television program, the parent may select option 206 to proceed with viewing the program and updating the user's viewing profile. In the example where the user wishes to preview the television program and judge its appropriateness for his or her child, the parent may select option 208 to proceed with viewing the program but not updating the user's viewing profile. In the example where the user is a parent who has accidentally selected this television program, the parent may select option 214 to cancel viewing of the television program. In the example where a child has selected to view the television program while the parent's user viewing profile is selected, the child may select option 214 to cancel viewing of the television program or the child may switch to his or her own user viewing profile using option 210 and proceed to reselect the television program for viewing. The provided examples do not limit the scope of the described systems and methods and may be equally applicable to other suitable situations where the selected television program is inconsistent with the currently selected user viewing profile.

Figure 3:
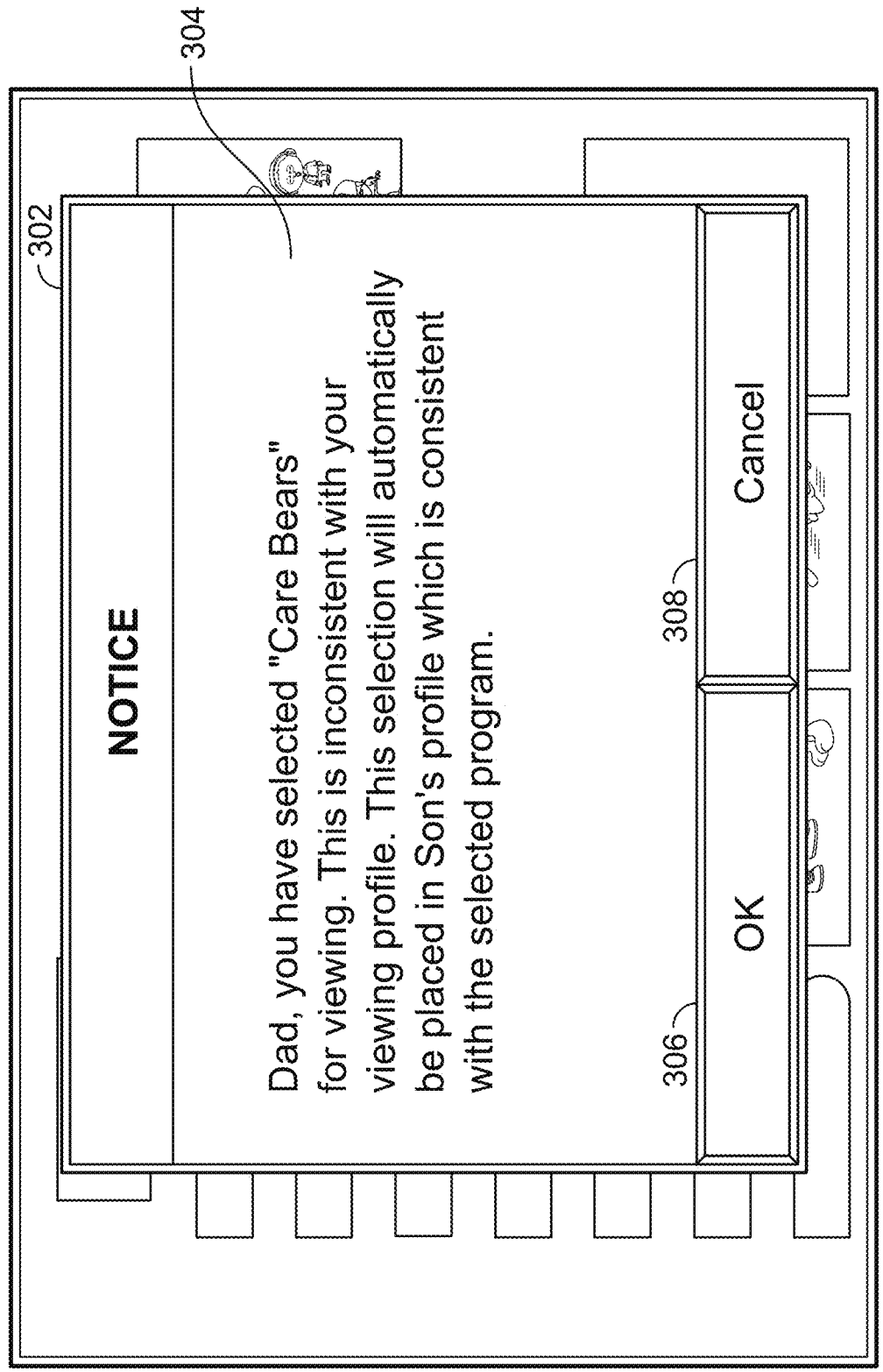
FIG. 3 shows yet another illustrative example of a display screen generated by a media guidance application in accordance with some embodiments of the disclosure.

FIG. 3 shows an illustrative example of a display screen 300 generated by the interactive media guidance application. In the example, the user has requested television program "Care Bears" for viewing. For example, the user may be a parent who is a fan and wishes to view the television program. In another example, the user may wish to preview the television program and judge its appropriateness for his or her child. In yet another example, the user may be a parent who has accidentally selected this television program. In yet another example, the user may be a child who has selected to view the television program while the parent's user viewing profile is selected.

The interactive media guidance application may retrieve a user viewing profile for the parent, i.e., the currently selected user, from remote sources 816 or 818 (FIG. 8) and/or a set of rules for the parent's user viewing profile from local storage 708 (FIG. 7). When a particular television program is viewed on a user's account that is not consistent with his or her regular viewing habits, the interactive media guidance application may generate prompt 302 and notify the user via message 304 that the selected program is inconsistent with the user's viewing profile. Additionally, message 304 may inform the user that the selection will automatically be placed in another profile which is consistent with the selected program. The user may choose to proceed via option 306 or cancel viewing of the television program via option 308. Accordingly, the user's viewing profile may be prevented from being corrupted if the media content is orthogonal to the user's typical viewing habits.

In the example where the user is a parent who is a fan of the television program, the parent may select option 308 to cancel viewing of the program. The parent may instead wish for the television program selection to be placed in his or her user viewing profile instead of the child's user viewing profile. In the example where the user wishes to preview the television program and judge its appropriateness for his or her child, the parent may select option 306 to proceed with viewing the program. However, the parent may instead select option 308 to cancel viewing of the program in case the user is concerned the program may not be appropriate for placement in the child's user viewing profile. In the example where the user is a parent who has accidentally selected this television program, the parent may select option 308 to cancel viewing of the television program. In the example where a child has selected to view the television program while the parent's user viewing profile is selected, the child may select option 306 to proceed in case the automatically selected user viewing profile belongs to the child. In case the automatically selected user viewing profile does not belong to the child, the child may switch to his or her own user viewing profile and proceed to reselect the television program for viewing. The provided examples do not limit the scope of the described systems and methods and may be equally applicable to other suitable situations where the selected television program is inconsistent with the currently selected user viewing profile.

Figure 4:
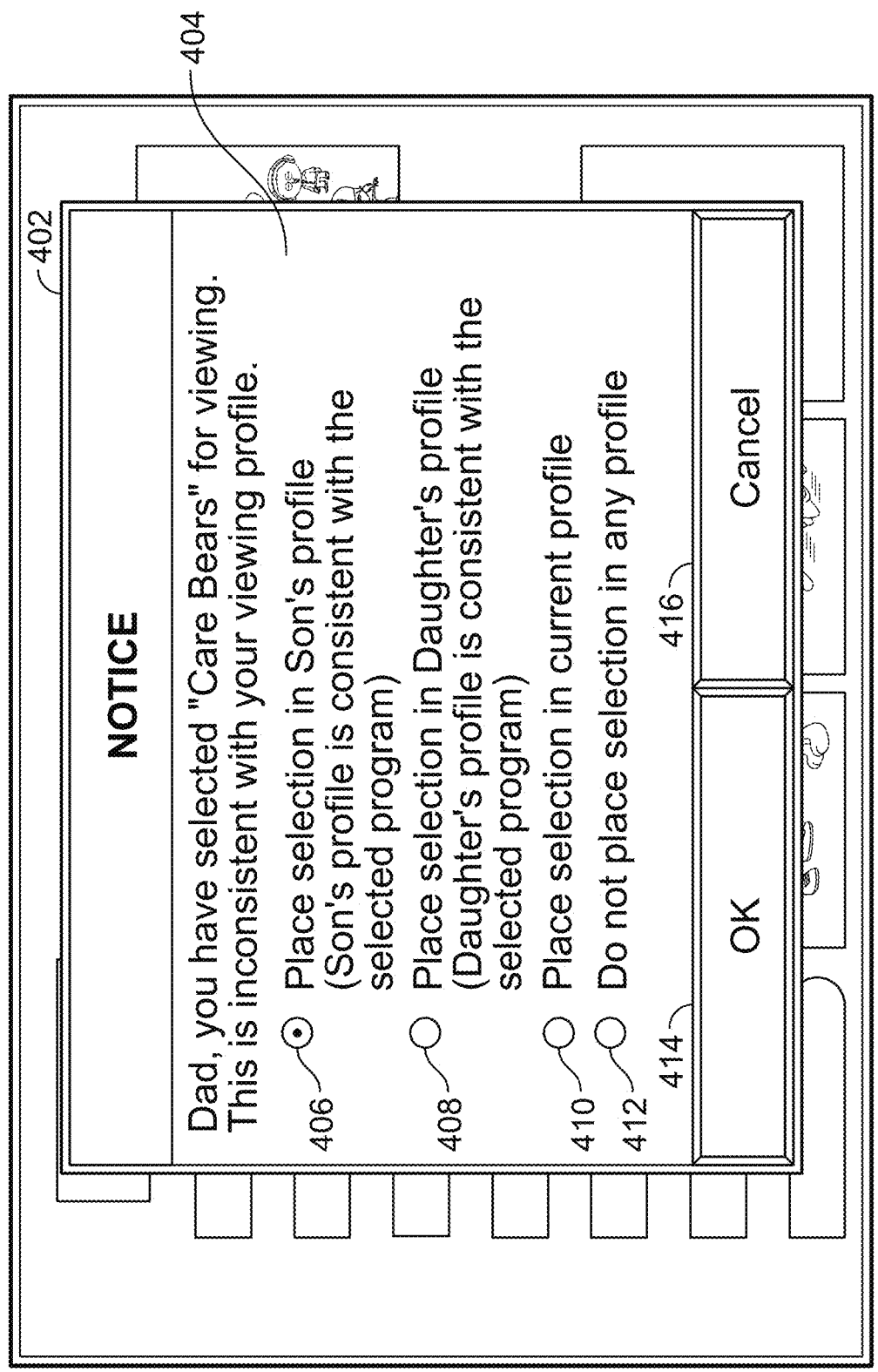
FIG. 4 shows yet another illustrative example of a display screen generated by a media guidance application in accordance with some embodiments of the disclosure.

FIG. 4 shows an illustrative example of a display screen 400 generated by the interactive media guidance application. In the example, the user has requested television program "Care Bears" for viewing. For example, the user may be a parent who is a fan and wishes to view the television program. In another example, the user may wish to preview the television program and judge its appropriateness for his or her child. In yet another example, the user may be a parent who has accidentally selected this television program. In yet another example, the user may be a child who has selected to view the television program while the parent's user viewing profile is selected.

The interactive media guidance application may retrieve a user viewing profile for the parent, i.e., the currently selected user, from remote sources 816 or 818 (FIG. 8) and/or a set of rules for the parent's user viewing profile from local storage 708 (FIG. 7). When a particular television program is viewed on a user's account that is not consistent with his or her regular viewing habits, the interactive media guidance application may generate prompt 402 and notify the user via message 404 that the selected program is inconsistent with the user's viewing profile. The user may choose to proceed via options 406, 408, 410, or 412. The user may proceed with the default option via option 414 or cancel viewing of the television program via option 416. Accordingly, the user's viewing profile may be prevented from being corrupted if the media content is orthogonal to the user's typical viewing habits.

In the example where the user is a parent who is a fan of the television program, the parent may select option 410 to place the selection in the user's currently selected profile and proceed with viewing the program. In the example where the user wishes to preview the television program and judge its appropriateness for his or her child, the parent may select option 412 to not place the selection in any user viewing profile and proceed with viewing the program. In the example where the user is a parent who has accidentally selected this television program, the parent may select option 416 to cancel viewing of the television program. In the example where a child has selected to view the television program while the parent's user viewing profile is selected, the child may select option 406 or 408 to select his or her user viewing profile and proceed with viewing the program. In case neither option relates to the child's user viewing profile, the child may cancel viewing of the television program via option 416. The child may switch to his or her own user viewing profile and proceed to reselect the television program for viewing. The provided examples do not limit the scope of the described systems and methods and may be equally applicable to other suitable situations where the selected television program is inconsistent with the currently selected user viewing profile.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 5:
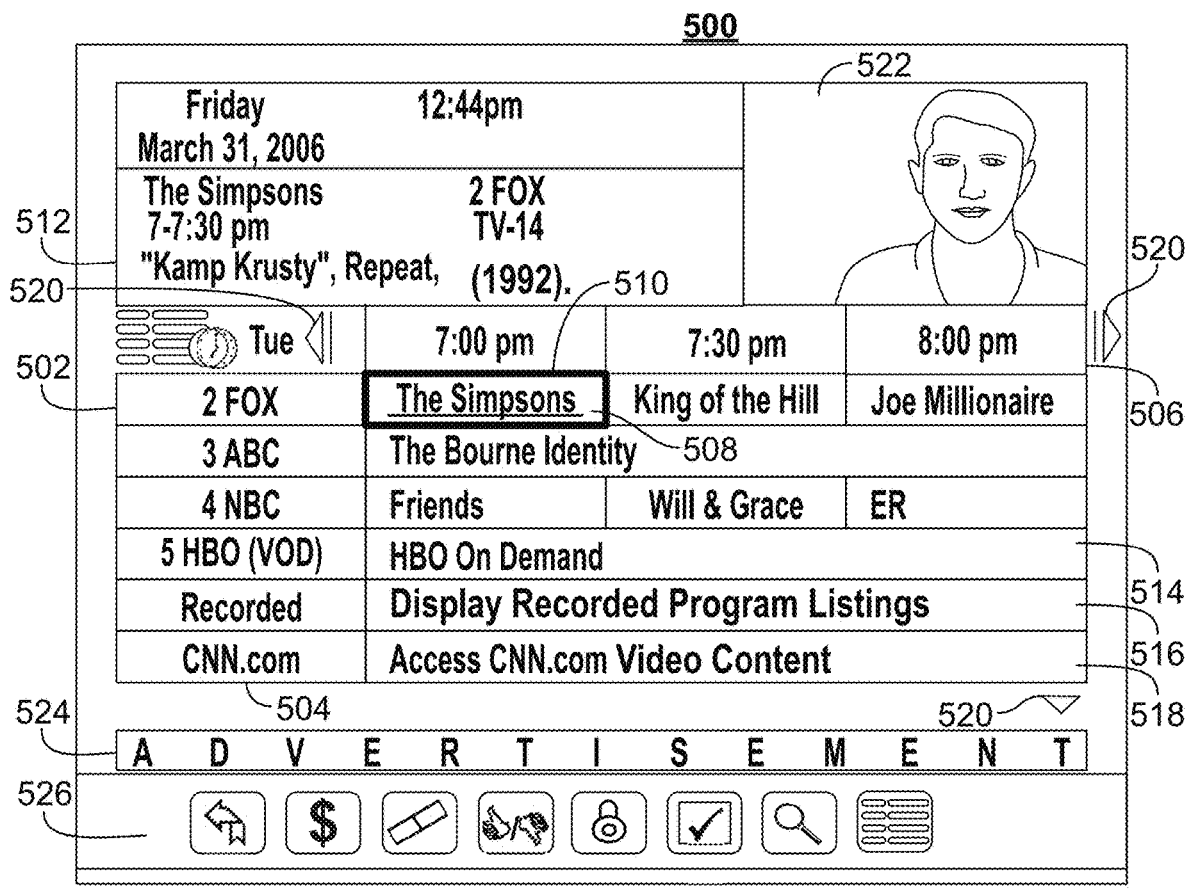
FIG. 5 shows yet another illustrative example of a display screen generated by a media guidance application in accordance with some embodiments of the disclosure.
Figure 6:
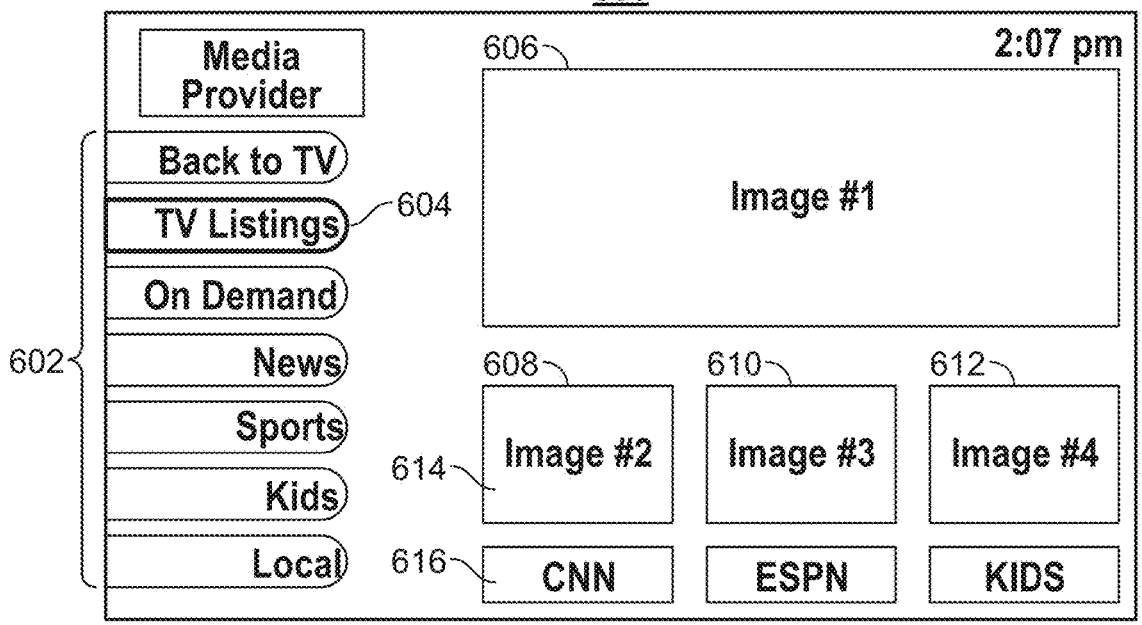
FIG. 6 shows yet another illustrative example of a display screen generated by a media guidance application in accordance with some embodiments of the disclosure.

FIGS. 5-6 show illustrative display screens that may be used to provide media guidance data. The display screens shown in FIGS. 5-6 may be implemented on any suitable user equipment device or platform. While the displays of FIGS. 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 5 shows illustrative grid of a program listings display 500 arranged by time and channel that also enables access to different types of content in a single display. Display 500 may include grid 502 with: (1) a column of channel/content type identifiers 504, where each channel/content type identifier (which is a cell in the column) identifies a different channel or content type available; and (2) a row of time identifiers 506, where each time identifier (which is a cell in the row) identifies a time block of programming. Grid 502 also includes cells of program listings, such as program listing 508, where each listing provides the title of the program provided on the listing's associated channel and time. With a user input device, a user can select program listings by moving highlight region 510. Information relating to the program listing selected by highlight region 510 may be provided in program information region 512. Region 512 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 502 may provide media guidance data for non-linear programming including on-demand listing 514, recorded content listing 516, and Internet content listing 518. A display combining media guidance data for content from different types of content sources is sometimes referred to as a "mixed-media" display. Various permutations of the types of media guidance data that may be displayed that are different than display 500 may be based on user selection or guidance application definition (e.g., a display of only recorded and broadcast listings, only on-demand and broadcast listings, etc.). As illustrated, listings 514, 516, and 518 are shown as spanning the entire time block displayed in grid 502 to indicate that selection of these listings may provide access to a display dedicated to on-demand listings, recorded listings, or Internet listings, respectively. In some embodiments, listings for these content types may be included directly in grid 502. Additional media guidance data may be displayed in response to the user selecting one of the navigational icons 520. (Pressing an arrow key on a user input device may affect the display in a similar manner as selecting navigational icons 520.)

Display 500 may also include video region 522, and options region 526. Video region 522 may allow the user to view and/or preview programs that are currently available, will be available, or were available to the user. The content of video region 522 may correspond to, or be independent from, one of the listings displayed in grid 502. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 526 may allow the user to access different types of content, media guidance application displays, and/or media guidance application features. Options region 526 may be part of display 500 (and other display screens described herein), or may be invoked by a user by selecting an on-screen option or pressing a dedicated or assignable button on a user input device. The selectable options within options region 526 may concern features related to program listings in grid 502 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 8. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 6. Video mosaic display 600 includes selectable options 602 for content information organized based on content type, genre, and/or other organization criteria. In display 600, television listings option 604 is selected, thus providing listings 606, 608, 610, and 612 as broadcast program listings. In display 600 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 608 may include more than one portion, including media portion 614 and text portion 616. Media portion 614 and/or text portion 616 may be selectable to view content in full-screen or to view information related to the content displayed in media portion 614 (e.g., to view listings for the channel that the video is displayed on).

The listings in display 600 are of different sizes (i.e., listing 606 is larger than listings 608, 610, and 612), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays. In some implementations, any action performed by control circuitry 704 may be based on instructions received from the media guidance application.

In client-server based embodiments, control circuitry 704 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment 700. Circuitry 704 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of user equipment device 700. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of user equipment device 700 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly-implemented on user equipment device 700. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server based application. Data for use by a thick or thin client implemented on user equipment device 700 is retrieved on-demand by issuing requests to a server remote to the user equipment device 700. In one example of a client-server based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays. For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 8:
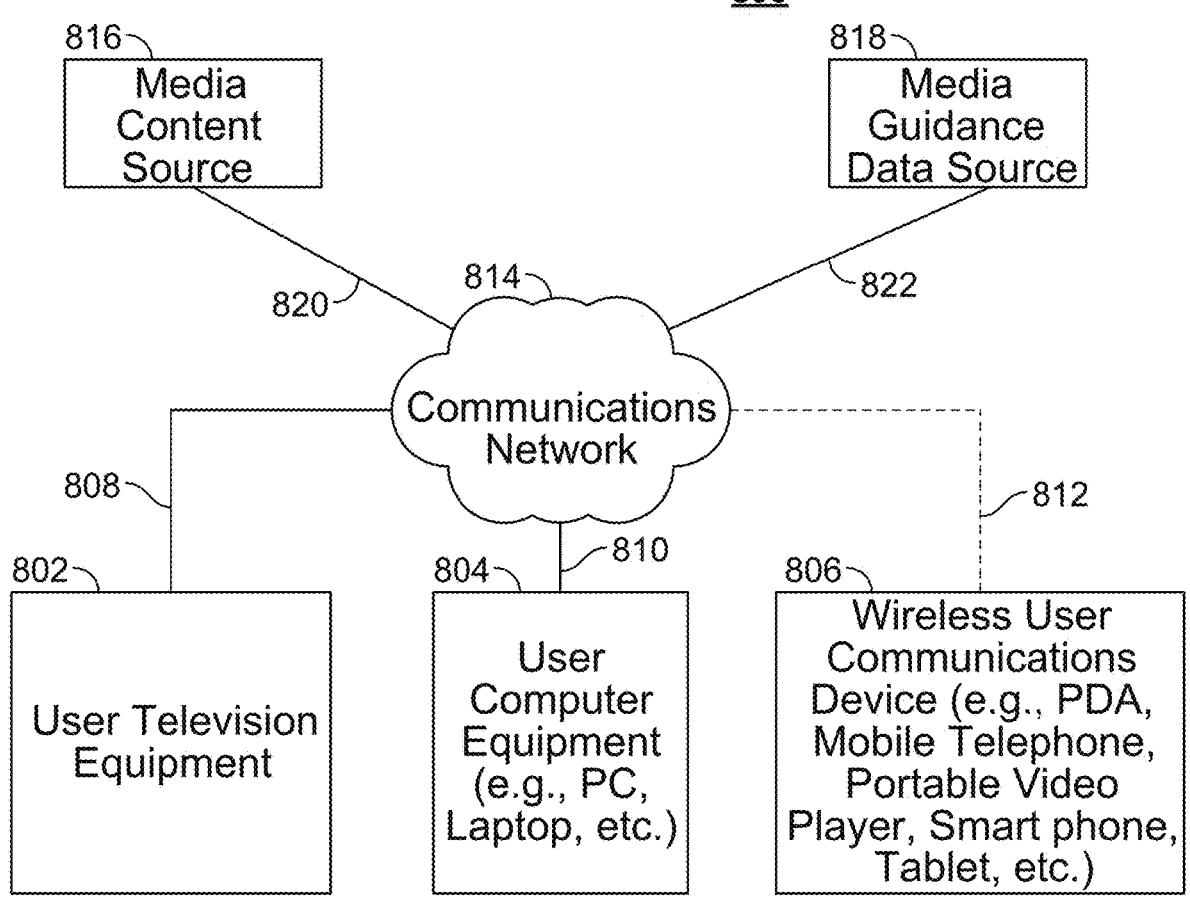
FIG. 8 is a block diagram of an illustrative media system in accordance with some embodiments of the disclosure.

User equipment device 700 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled allowing for access to Internet content, while user computer equipment 804 may, like some television equipment 802, include a tuner allowing for access to television programming. The media guidance application may have the same layout on various different types of user equipment or may be tailored to the display capabilities of the user equipment. For example, on user computer equipment 804, the guidance application may be provided as a web site accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively. Communications network 814 may be one or more networks including the Internet, a mobile phone network, mobile voice or data network (e.g., a 4G or LTE network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communication paths 820 and 822, respectively. Paths 820 and 822 may include any of the communication paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment devices 802, 804, and 806 are shown as through communications network 814, in some embodiments, sources 816 and 818 may communicate directly with user equipment devices 802, 804, and 806 via communication paths (not shown) such as those described above in connection with paths 808, 810, and 812.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 818 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment devices 802, 804, and 806 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 708, and executed by control circuitry 704 of a user equipment device 700. In some embodiments, media guidance applications may be client-server applications where only a client application resides on the user equipment device, and server application resides on a remote server. For example, media guidance applications may be implemented partially as a client application on control circuitry 704 of user equipment device 700 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment devices 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 814. These cloud resources may include one or more content sources 816 and one or more media guidance data sources 818. In addition or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 9:
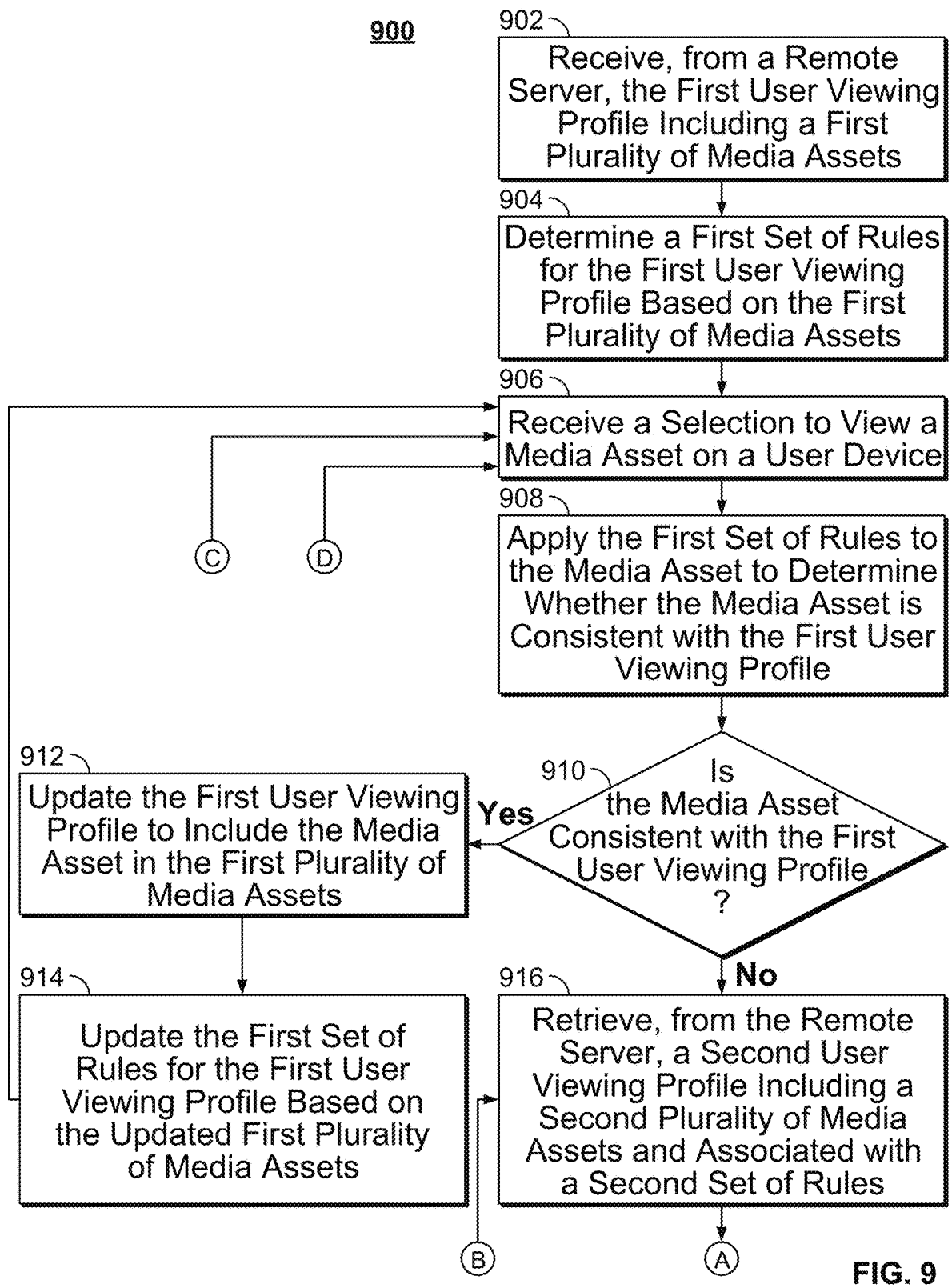
FIG. 9 is a flowchart of an illustrative process for preventing corruption of a first user viewing profile of a first user in accordance with some embodiments of the disclosure.
Figure 9:
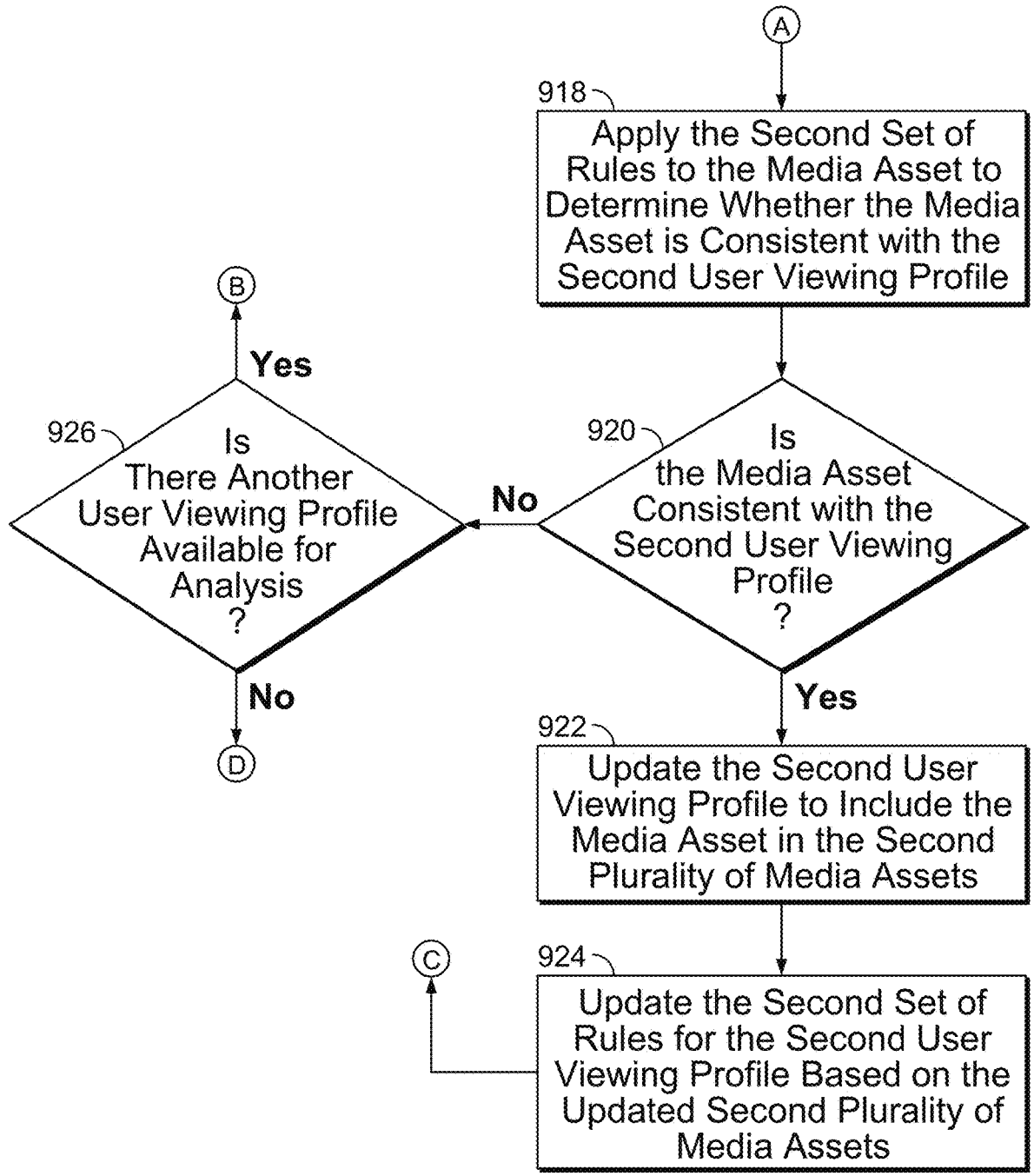

FIG. 9 is a flowchart of an illustrative process 900 for control circuitry (e.g., control circuitry 704) to prevent corruption of a first user viewing profile of a first user in accordance with some embodiments of the disclosure. In some embodiments this algorithm may be encoded onto a non-transitory storage medium (e.g., storage device 708) as a set of instructions to be decoded and executed by processing circuitry (e.g., processing circuitry 706). Processing circuitry may in turn provide instructions to other sub-circuits contained within control circuitry 704, such as the tuning, video generating, encoding, decoding, encrypting, decrypting, scaling, analog/digital conversion circuitry, and the like.

At step 902, control circuitry 704 receives, from a remote server, the first user viewing profile including a first plurality of media assets. At step 904, control circuitry 704 determines a first set of rules for the first user viewing profile based on the first plurality of media assets. In some embodiments, control circuitry 704 determines the first set of rules for the first user viewing profile based on the first plurality of media assets by retrieving one or more metadata tags for each of the first plurality of media assets, determining one or more trends in the one or more metadata tags for each of the first plurality of media assets, and determining the first set of rules based on the one or more trends. In some embodiments, the one more metadata tags includes one or more of a genre, a time slot, a title, a channel, a media source, a language, a month, a day of week, a parental rating, and a popularity rating. At step 906, control circuitry 704 receives a selection to view a media asset on the user device. At step 908, control circuitry 704 applies the first set of rules to the media asset to determine whether the media asset is consistent with the first user viewing profile. In some embodiments, control circuitry 704 applies the first set of rules to the media asset to determine whether the media asset is consistent with the first user viewing profile by retrieving one or more metadata tags for the media asset, and determining, based on the one or more metadata tags, whether any of the first set of rules indicate a likelihood of the first user having selected the media asset.

At step 910, control circuitry 704 determines whether the media asset is consistent with the first user viewing profile. If the media asset is consistent with the first user viewing profile, at step 912, control circuitry 704 updates the first user viewing profile to include the media asset in the first plurality of media assets. At step 914, control circuitry 704 further updates the first set of rules for the first user viewing profile based on the updated first plurality of media assets and returns to step 906. In some embodiments, the first set of rules is stored in a local memory of the user device and the first viewing profile is stored on the remote server.

If the media asset is not consistent with the first user viewing profile, at step 916, control circuitry 704 retrieves, from the remote server, a second user viewing profile for a second user of the user device. The second user viewing profile includes a second plurality of media assets and associated with a second set of rules. At step 918, control circuitry 704 further applies the second set of rules to the media asset to determine whether the media asset is consistent with the second user viewing profile. In some embodiments, the second set of rules is stored in a local memory of the user device and the second viewing profile is stored on the remote server.

At step 920, control circuitry 704 determines whether the media asset is consistent with the second user viewing profile. If the media asset is consistent with the second user viewing profile, at step 922, control circuitry 704 updates the second user viewing profile to include the media asset in the second plurality of media assets. At step 924, control circuitry 704 further updates the second set of rules for the second user viewing profile based on the updated second plurality of media assets and returns to step 906. If the media asset is not consistent with the second user viewing profile, at step 926, control circuitry 704 determines whether another user viewing profile is available for analysis. If another user viewing profile is not available, control circuitry 704 proceeds to step 906 and waits for another selection to view a media asset on the user device. If another user viewing profile is available, control circuitry 704 proceeds to step 916 to retrieve another user viewing profile for analysis.

In some embodiments, control circuitry 704 generates for display a prompt requesting confirmation from the first user whether to proceed with the selected media asset in response to determining that the media asset is not consistent with the first user viewing profile. In some embodiments, in response to receiving the confirmation from the first user to proceed with the selected media asset, control circuitry 704 generates for display another prompt requesting a passcode from the first user. In some embodiments, control circuitry 704 receives the passcode. In response to the passcode being incorrect, control circuitry 704 generates for display the media asset but prevents the media asset from being included in the first user viewing profile. In some embodiments, in response to the passcode being correct, control circuitry 704 generates for display the media asset and includes the media asset in the first user viewing profile.

It is contemplated that the steps or descriptions of FIG. 9 may be used with any other embodiment of this disclosure. In addition, the descriptions described in relation to the algorithm of FIG. 9 may be done in alternative orders or in parallel to further the purposes of this disclosure. For example, conditional statements and logical evaluations, such as those at 910, 920, and 926, may be performed in any order or in parallel or simultaneously to reduce lag or increase the speed of the system or method. As a further example, in some embodiments several instances of a variable may be evaluated in parallel, using multiple logical processor threads, or the algorithm may be enhanced by incorporating branch prediction. Furthermore, it should be noted that the process of FIG. 9 may be implemented on a combination of appropriately configured software and hardware, and that any of the devices or equipment discussed in relation to FIGS. 7-8 could be used to implement one or more portions of the process.

Figure 10:
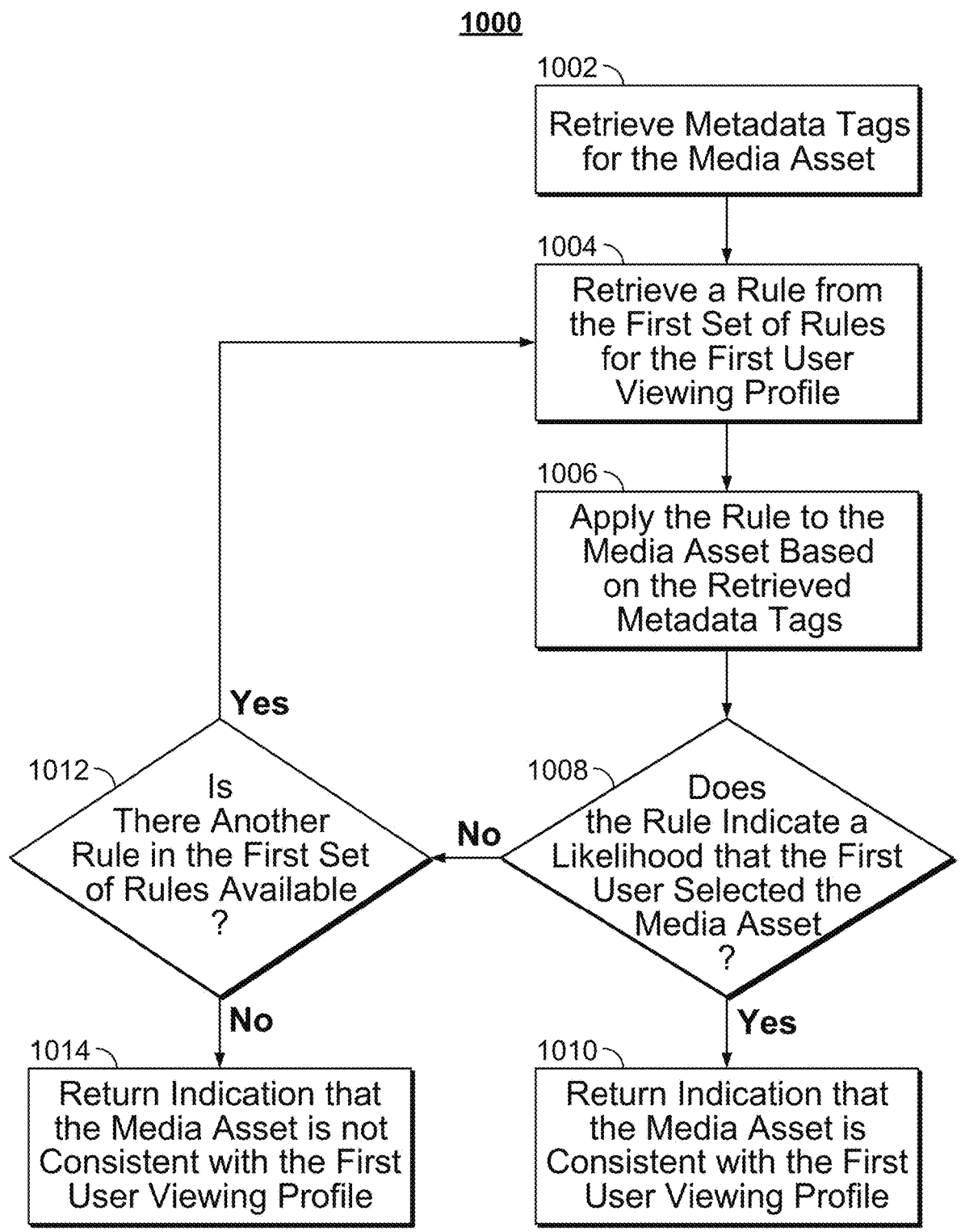
FIG. 10 is a flowchart of an illustrative process for determining whether the selected media asset is consistent with the first user viewing profile in accordance with some embodiments of the disclosure.

FIG. 10 is a flowchart of an illustrative process 1000 for control circuitry (e.g., control circuitry 704) to determine whether the selected media asset is consistent with the first user viewing profile in accordance with some embodiments of the disclosure. The illustrative process provides exemplary steps for executing step 908 of FIG. 9. In some embodiments this algorithm may be encoded onto a non-transitory storage medium (e.g., storage device 708) as a set of instructions to be decoded and executed by processing circuitry (e.g., processing circuitry 706). Processing circuitry may in turn provide instructions to other sub-circuits contained within control circuitry 704, such as the tuning, video generating, encoding, decoding, encrypting, decrypting, scaling, analog/digital conversion circuitry, and the like.

At step 1002, control circuitry 704 retrieves one or more metadata tags for the media asset, e.g., from source 816 or 818. For example, a metadata tag may indicate the media asset belongs to the drama genre. At step 1004, control circuitry 704 retrieves a rule from the first set of rules for the first user viewing profile, e.g., from storage 708. For example, the rule may indicate that the user predominantly watches television programs from the comedy genre on weekdays. In such a case, if the user were to select a television program belonging to the drama genre on a weekday, control circuitry 704 may determine the selected television program to be inconsistent with the user's viewing profile. In another case, if the user were to select a television program belonging to the comedy genre on a weekday, control circuitry 704 may determine the selected television program to be consistent with the user's viewing profile.

At step 1006, control circuitry 704 applies the rule to the media asset based on the retrieved metadata tags. At step 1008, control circuitry 704 determines, based on the metadata tags, whether the rule indicates a likelihood of the first user having selected the media asset. If the rule indicates a likelihood of the first user having selected the media asset, at step 1010, control circuitry 704 returns an indication that the media asset is consistent with the first user viewing profile. If the rule does not indicate a likelihood of the first user having selected the media asset, at step 1012, control circuitry 704 determines whether another rule in the first set of rules is available for application. If another rule is available, control circuitry 704 returns to step 1004 and retrieves the rule from the first set of rules for the first user viewing profile, e.g., from storage 708. If another rule is not available, at step 1014, control circuitry 704 returns an indication that the media asset is not consistent with the first user viewing profile.

It is contemplated that the steps or descriptions of FIG. 10 may be used with any other embodiment of this disclosure. In addition, the descriptions described in relation to the algorithm of FIG. 10 may be done in alternative orders or in parallel to further the purposes of this disclosure. For example, conditional statements and logical evaluations, such as those at 1008 and 1012, may be performed in any order or in parallel or simultaneously to reduce lag or increase the speed of the system or method. As a further example, in some embodiments several instances of a term in the query may be evaluated in parallel, using multiple logical processor threads, or the algorithm may be enhanced by incorporating branch prediction. Furthermore, it should be noted that the process of FIG. 10 may be implemented on a combination of appropriately configured software and hardware, and that any of the devices or equipment discussed in relation to FIGS. 7-8 could be used to implement one or more portions of the process.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving a selection of a media asset identifier corresponding to a media asset while a first viewing profile is a selected profile;
   in response to detecting that metadata of the media asset does not match metadata of the first viewing profile, generating for display a prompt comprising:
   a first selectable option to view the media asset and update the first viewing profile based on the metadata of the media asset; and
   a second selectable option to change the selected profile to a second viewing profile, wherein the metadata of the media asset matches metadata of the second viewing profile.

2. The method of claim 1, further comprising:
   in response to receiving a selection of the first selectable option:
   generating for display the media asset; and
   updating the first viewing profile based on the metadata of the media asset.

3. The method of claim 1, further comprising:
   in response to receiving a selection of the second selectable option:
   changing the selected profile to the second viewing profile; and
   updating the second viewing profile based on the metadata of the media asset.

4. The method of claim 1, wherein the prompt comprises a third selectable option to play the media asset and prevent update of the first viewing profile to include the metadata of the media asset, the method further comprising:
    in response to receiving a selection of the third selectable option:
        generating for display the media asset; and
        preventing update of the first viewing profile to include the metadata of the media asset.

5. The method of claim 1, wherein the prompt comprises a notification indicating that the metadata of the media asset does not match the metadata of the first viewing profile.

6. The method of claim 1, wherein the prompt comprises a third selectable option to update the second viewing profile to include the metadata of the media asset without changing the selected profile, the method further comprising:
    in response to receiving a selection of the third selectable option:
        maintaining the first viewing profile as the selected profile; and
        updating the second viewing profile to include the metadata of the media asset.

7. The method of claim 6, further comprising determining that the metadata of the media asset matches metadata of a third viewing profile, and wherein the prompt further comprises a fourth selectable option to update the third viewing profile to include the metadata of the media asset without changing the selected profile.

8. The method of claim 1, further comprising:
    in response to detecting that the metadata of the media asset does not match the metadata of the first viewing profile, identifying the media asset as a corrupting media asset for the first viewing profile.

9. The method of claim 1, wherein the detecting that the metadata of the media asset does not match the metadata of the first viewing profile comprises:
    determining a set of rules based on the metadata of the first viewing profile; and
    determining, based on the set of rules, that the metadata of the media asset does not match the metadata of the first viewing profile.

10. The method of claim 9, further comprising storing the set of rules in association with the first viewing profile.

11. A system comprising:
    input/output (I/O) circuitry configured to:
        receive a selection of a media asset identifier corresponding to a media asset, wherein the selection is received while a first viewing profile is a selected profile; and
    control circuitry coupled to the I/O circuitry and configured to:
        in response to detecting that metadata of the media asset does not match metadata of the first viewing profile, generate for display a prompt comprising:
            a first selectable option to view the media asset and update the first viewing profile based on the metadata of the media asset; and
            a second selectable option to change the selected profile to a second viewing profile, wherein the metadata of the media asset matches metadata of the second viewing profile.

12. The system of claim 11, wherein the control circuitry is further configured to:
    in response to receiving a selection of the first selectable option:
        generate for display the media asset; and
        update the first viewing profile based on the metadata of the media asset.

13. The system of claim 11, wherein the control circuitry is further configured to:
    in response to receiving a selection of the second selectable option:
        change the selected profile to the second viewing profile; and
        update the second viewing profile based on the metadata of the media asset.

14. The system of claim 11, wherein the prompt comprises a third selectable option to play the media asset and prevent update of the first viewing profile to include the metadata of the media asset, and wherein the control circuitry is further configured to:
    in response to receiving a selection of the third selectable option:
        generate for display the media asset; and
        prevent update of the first viewing profile to include the metadata of the media asset.

15. The system of claim 11, wherein the prompt comprises a notification indicating that the metadata of the media asset does not match the metadata of the first viewing profile.

16. The system of claim 11, wherein the prompt comprises a third selectable option to update the second viewing profile to include the metadata of the media asset without changing the selected profile, and wherein the control circuitry is further configured to:
    in response to receiving a selection of the third selectable option:
        maintain the first viewing profile as the selected profile; and
        update the second viewing profile to include the metadata of the media asset.

17. The system of claim 16, wherein the control circuitry is further configured to determine that the metadata of the media asset matches metadata of a third viewing profile, and wherein the prompt further comprises a fourth selectable option to update the third viewing profile to include the metadata of the media asset without changing the selected profile.

18. The system of claim 11, wherein the control circuitry is further configured to:
    in response to detecting that the metadata of the media asset does not match the metadata of the first viewing profile, identify the media asset as a corrupting media asset for the first viewing profile.

19. The system of claim 11, wherein the control circuitry, when detecting that the metadata of the media asset does not match the metadata of the first viewing profile, is configured to:
    determine a set of rules based on the metadata of the first viewing profile; and
    determine, based on the set of rules, that the metadata of the media asset does not match the metadata of the first viewing profile.

20. The system of claim 19, wherein the control circuitry is further configured to store the set of rules in association with the first viewing profile.

* * * * *